Nov. 18, 1924.
W. C. HACKMAN
1,516,094
WATER LEVEL RECORDING DEVICE
Filed July 3, 1922
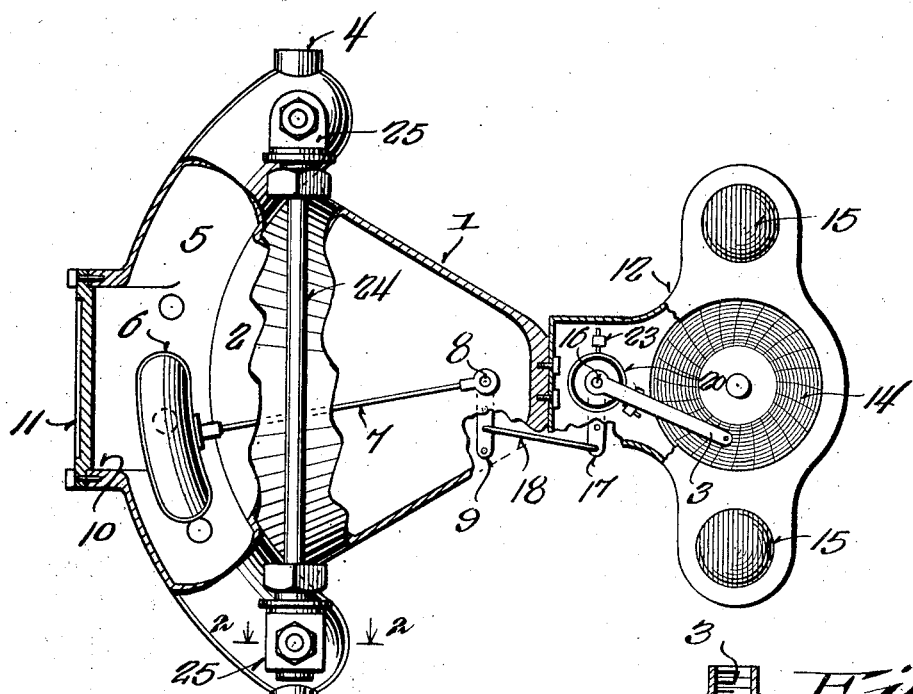
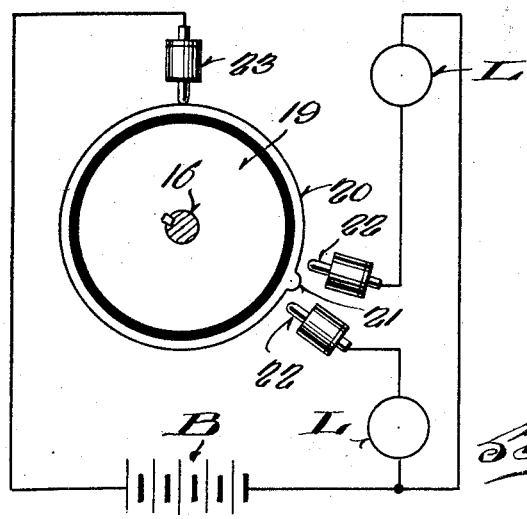
Inventor
William C. Hackman
By
Attorneys Patented Nov. 18, 1924.

1,516,094

UNITED STATES PATENT OFFICE.

WILLIAM C. HACKMAN, OF MILWAUKEE, WISCONSIN, ASSIGNOR, BY DIRECT AND MESNE ASSIGNMENTS, TO HACKMAN MANUFACTURING COMPANY, OF MILWAUKEE, WISCONSIN.

WATER-LEVEL-RECORDING DEVICE.

Application filed July 3, 1922. Serial No. 572,540.

*To all whom it may concern:*

Be it known that I, WILLIAM C. HACKMAN, a citizen of the United States, and resident of Milwaukee, in the county of Milwaukee and State of Wisconsin, have invented certain new and useful Improvements in Water-Level-Recording Devices; and I do hereby declare that the following is a full, clear, and exact description thereof.

This invention relates to improvements in water level recording devices of the general character described in my co-pending application, Serial No. 520,829.

The primary object of the present invention is to provide a simple, compact and efficient device, adapted to accurately record variations of the water level in a boiler, said device being constructed as a single unit, capable of being attached to any conventional type of boiler in place of the ordinary water glass or side gauge.

With the foregoing and other objects in view which will be more apparent as the description proceeds, my invention consists in what is herein shown and described and more particularly pointed out and defined by the appended claim, it being borne in mind that various modifications of the structural details are contemplated as within the appended claim.

In the drawings,

Figure 1 is an elevational view of the invention with parts broken away and in section to more clearly illustrate the structural details.

Figure 2 is a detail sectional view taken on the line 2—2 of Figure 1, and

Figure 3 is a diagrammatical view illustrating the electrical wiring.

Referring now more particularly to the accompanying drawings, the numeral 1 designates a housing which forms the float chamber 2, provided with an inlet port 3 and outlet 4, which ports are provided with suitable connections, (not shown) whereby they communicate with a boiler above and below the line of normal water level. The housing, which is provided at one edge with an enlarged arcuate float passage 5, is adapted to receive a float 6 which is mounted on the end of the arm 7 secured to the shaft 8, which shaft projects thru the side wall of the housing to receive the lever 9. An enlarged opening 10 is provided in the float passage to permit the insertion of the float 6 and assembling of the same within the float chamber. A cover 11 is bolted to the housing and forms a closure for the opening 10.

Attached to the housing 1, at its restricted end, is a casing 12 which serves to house the stylus 13 and record receiving dial 14, together with a time mechanism (not shown) for rotating the dial.

In addition to the foregoing, the casing is also provided with a pair of lenses 15, which lenses are adapted to be illuminated for the purpose of giving a visible signal.

The stylus 13 is secured on a pintle 16 having its bearing in the casing 12 and projecting thru one side thereof to receive a lever 17, which lever is connected to the lever 9 on the float shaft 8 by means of a link 18.

In addition to the stylus, a contact disk 19 is keyed on the pivot 16, and is provided with an annular contact ring 20, having a nib or projection 21, adapted to engage the contacts 22 upon rotation of the disk. The metal ring 20 is suitably insulated from the disk 19, as best indicated in Figure 3 of the drawings, whereby the lamp circuits are insulated from the stylus casing, it being understood that the brushes 22 and 23 are also insulated from the wall of the casing. Current is imparted to the contact ring 20 thru the brush 23, which is connected with the battery B. Each of the contact members 22 are connected to an incandescent light L, illustrated in the diagrammatic view of Figure 3, and from there back to the battery B.

As illustrated in Figure 1 of the drawing, in some instances I desire to use a conventional sight glass 24, which, by means of the couplings 25, communicates with the float chamber adjacent its upper and lower extremity, thereby enabling the operator to readily determine the water level in the usual manner without referring to the minute graduations of the record receiving dial. The lower end of the float passage is provided with a blow-off opening 26, which is closed by the plug 26'.

In the operation of the device, it will be observed that as the water level in the float chamber 2 varies, the float 6 will be caused to oscillate, thereby rotating the shaft 8, and thru the lever and link connection with the pintle 16, the stylus 13 will be oscillated to record such movement on the dial, the dial being provided with radial time graduations and annular graduations for recording the oscillation of the stylus, resulting from variations in water level.

As the pivot 16 and contact ring 20 rotate in either direction from their normal position, the projection 21 will engage, at a predetermined point, one of the brushes 22, thereby closing the circuit to one of the lights L, and visibly indicating either a high or low water level, by illuminating one of the lenses 15.

It will be understood that while I have shown and described means for providing a visible signal upon occurrence of a predetermined high and low water level, the same is not essential to the recording feature of the present invention, and therefore does not form a specific part of the same other than the combination as hereinafter claimed.

Before presenting this application for patent, applicant, by an actual reduction to practice, has thoroughly tested out the apparatus and it has been tested by uninterested engineers who have reported the device entirely satisfactory and that it meets with all of the requirements of insurance companies.

I claim:

In a water level recording device including a sector shaped housing having a flat base opposite a curved portion, a transversely disposed float shaft journalled in the wall of the housing near the base thereof having one end extended through said housing, a float carrying arm secured to the shaft and a lever secured to the extended end of the shaft, the combination of a recording device casing directly secured to the flat base of the housing, a stylus pintle journalled in the walls of the casing and having one end projecting therethrough, a lever secured to said end, and a link connecting the pintle lever whereby parallel motion is imparted to the levers through rise and fall of the float arm.

In testimony that I claim the foregoing I have hereunto set my hand at Milwaukee, in the county of Milwaukee and State of Wisconsin.

WILLIAM C. HACKMAN.